April 3, 1951          A. J. WILLIAMS, JR          2,547,105
SYSTEM FOR MEASUREMENT OF SMALL CURRENTS
Filed Dec. 18, 1946          2 Sheets-Sheet 1
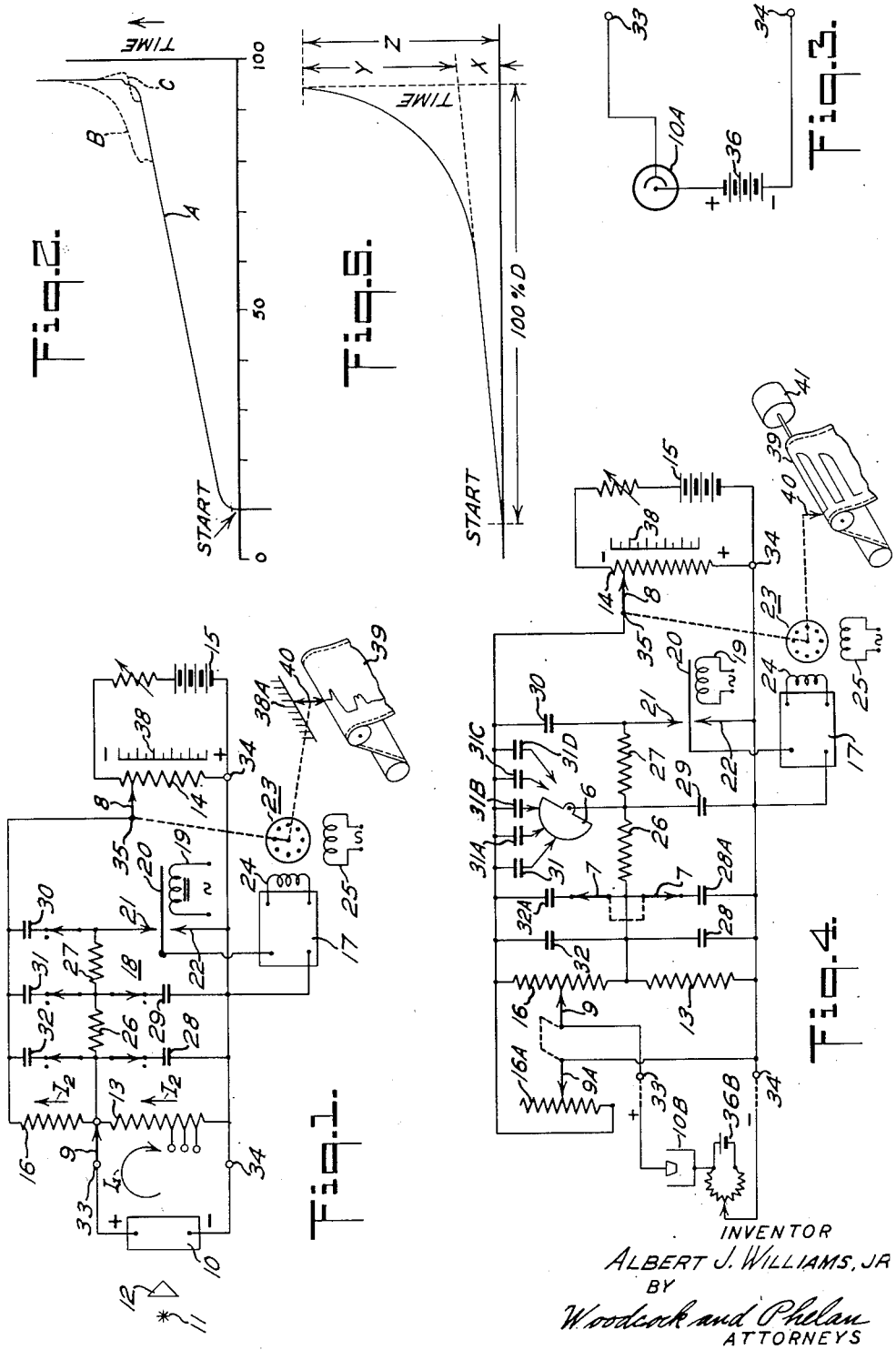
INVENTOR
ALBERT J. WILLIAMS, JR
BY
Woodcock and Phelan
ATTORNEYS

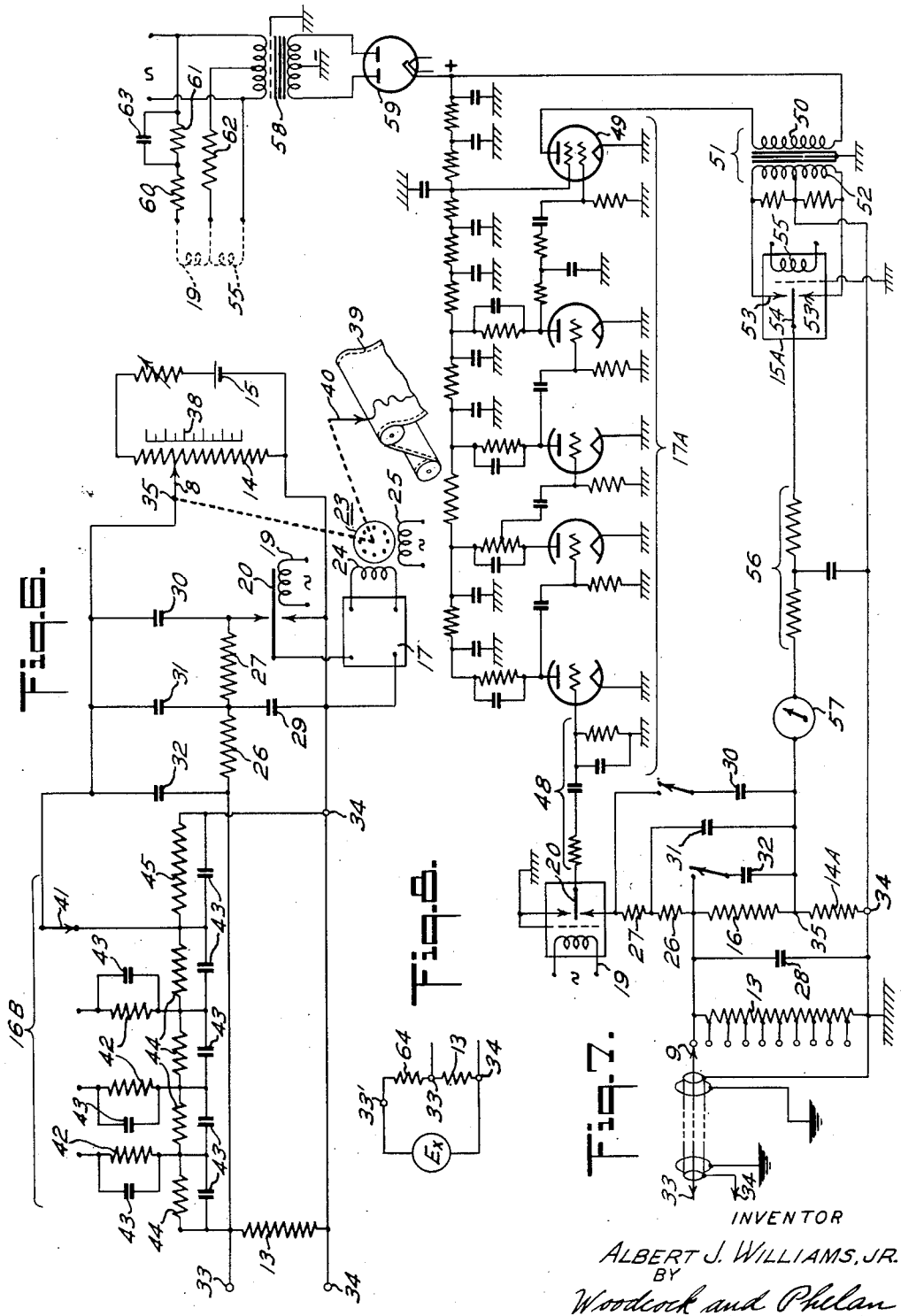

Patented Apr. 3, 1951

2,547,105

UNITED STATES PATENT OFFICE 2,547,105

SYSTEM FOR MEASUREMENT OF SMALL CURRENTS

Albert J. Williams, Jr., Philadelphia, Pa., assignor to Leeds and Northrup Company, Philadelphia, Pa., a corporation of Pennsylvania Application December 18, 1946, Serial No. 716,973

19 Claims. (Cl. 171—95)

This invention relates to balanceable measuring systems suited for measurement of small currents, for example, of the order of microamperes, and is particularly concerned with avoiding, at balance, the introduction into the circuit under test of appreciable effective voltage or resistance.

In accordance with the invention, the source of unknown current and a source of variable standard current are connected in series-aiding relation to a pair of circuit junctions whose difference of potential, as detected by a sensitive device, is adjusted, preferably automatically, to zero so that at balance the measuring network appears to the source of unknown current as a short-circuit between said junctions: and with the detector there is associated at least one resistance-reactance network which controls response of the detector to abrupt changes of current from at least one of said sources.

More specifically, the connections from said junction points to the detector include a filter network which minimizes or averages response of the detector to rapid fluctuations of the unknown current and alternatively, or in addition, the connections from said junction points to the source of standard current include a damping network which controls response of the detector to changes of the standard current and avoids hunting and overshooting when the standard current is varied automatically to effect rebalance in minimum time: more particularly, when both networks are used, the constants of the damping network are chosen to introduce positive damping of magnitude insuring stability of the detector despite negative damping produced by the filter network.

The invention further resides in measuring systems having features of combination and arrangement hereinafter described and claimed.

For more detailed understanding of the invention and for illustration of embodiments thereof, reference is made to the accompanying drawings, in which:

Fig. 1 schematically illustrates one modification of the system and as used for analysis of emission or absorption spectra;

Fig. 2 is an explanatory figure referred to in discussion of the operation of the system of Fig. 1;

Fig. 3 is referred to in explanation of other uses of the measuring circuit of Fig. 1 and of other figures;

Fig. 4 schematically illustrates a modification of Fig. 1 and as used with a mercury-dropping electrode for electro-chemical analysis;

Fig. 5 is an explanatory figure: a response characteristic referred to in general discussion of the systems of Figs. 1 and 4;

Fig. 6 schematically illustrates another modification;

Fig. 7 schematically illustrates a further modification in which automatic rebalancing of the measuring circuit is effected by a feedback amplifier arrangement; and Fig. 8 is referred to in explanation of another use of the measuring circuit of Figs. 1, 4 and 7.

In some fields of electrical measurements, there are used responsive devices whose short-circuit current is a function of a condition sought to be measured and for accuracy the measuring circuit should present or look like a short-circuit to such devices. For example, where a photo-electric cell of the barrier-layer type is used in analysis of a spectrum, the short-circuit current of that type of cell is a direct measure of the intensity of that portion or line of the spectrum viewed by the cell. As hereinafter appears, this current is measured by a system or network which introduces no appreciable voltage or effective resistance into the current circuit of the cell.

As will be understood by those versed in the art of spectrochemical analysis, a material or substance to be analyzed may be used as the electrodes of an arc or spark discharge forming a light source 11 whose spectrum is produced by prism 12 or a suitable grating. The photo-cell 10 is disposed or moved to view or scan a selected portion or line of the spectrum and the percentage composition of the one or more elements of the material is determined by measurement of the current of the cell 10.

As shown in Fig. 1, the cell 10 is connected in series with a resistor 13 so that its output current $I_1$ traverses that resistor. However, the voltage drop across the resistor 13 and its effective magnitude of resistance as seen by the photo-cell 10 is reduced to negligible value by connection of the resistor 13 in circuit with a source of current $I_2$ so poled that the current $I_2$ flows through resistor 13 in opposition to the cell current $I_1$: moreover, current $I_2$ is adjusted so that it is substantially equal in magnitude to the photo-tube current $I_1$. With the currents so balanced, the photo-tube 10 is looking into what to it appears as a short-circuit and the current $I_2$ then flowing is a true measure of the intensity of the radiation received by the cell.

More specifically, in the system of Fig. 1 the source of variable standard current $I_2$ comprises a slidewire 14 connected between terminals 34, 35 of the measuring network and traversed by current of constant magnitude supplied from battery 15 or equivalent source. The calibrated resistor 16, in series with the slidewire 14 and the measuring resistor 13, determines the range over which the standard current may be varied by adjustment of the slidewire 14 relative to its contact 8. By way of example, the circuit constants may be such that by substitution of different calibrated resistors 16, the instrument may have the fundamental measuring ranges of 0–1 microampere, 0–5 microamperes and 0–50 microamperes. In all cases, the resistance of resistor 16 should be high compared to that of resistor 14. Other preferred arrangements for changing the measuring range are later herein described.

In effecting a measurement of current $I_1$, the standard current $I_2$ is so varied that the voltage drop across the resistor 13, as produced by the difference of the two oppositely flowing currents, becomes substantially zero and the source of the unknown current $I_1$, photo-cell 10, is therefore looking at what to it appears to be a short-circuit between junctions 33, 34, the input terminals of the measuring network. This condition of current balance may be detected by any suitable null-type detector, such as a sensitive galvanometer; preferably, however, the detector is of the type disclosed in my U. S. Letters Patent No. 2,367,746 and shown in Fig. 1 hereof in simplified form. In brief, the detector comprises a thermionic amplifier 17 with whose input circuit is associated a synchronous vibrator 18 including a magnet coil 19 energized from a suitable source of alternating current and having a movable contact 20 vibrated by the coil alternately to engage fixed contacts 21 and 22. The contacts 21 and 22 are respectively connected to opposite terminals of the resistor 13 so that vibration of contact 20 produces in the input circuit of the amplifier 17 a signal voltage whose magnitude is a direct function of or corresponds with the voltage drop across the resistor 13. At balance, the signal output of the amplifier is essentially zero.

Preferably and as shown, the detector is included in a system which effects automatic rebalancing adjustments of the slidewire 14 to effect and maintain the variable standard current $I_2$ in balance with the photo-cell current $I_1$. To that end, there may be utilized, as more fully explained in my aforesaid patent, an induction motor 23, one of whose windings 24 is included in the output system of the amplifier 17 and the other of whose windings 25 is energized from the same source as that supplying the vibrator coil 19. Accordingly, when the standard current $I_2$ is less or greater than the photo-cell current $I_1$, the winding 24 of the motor is energized, the phase relation between its current and that of the continuously excited winding 25 depending upon the sense of unbalance of the currents $I_1$ and $I_2$. Whenever the currents $I_1$ and $I_2$ are not in balance, the motor 23 therefore rotates in proper direction to adjust the standard current in sense to restore the voltage drop across the resistor 13 to zero value.

At balance or null signal input to the detector, the position of the adjustable element of the slidewire with respect to a scale 38 is a direct measure of the current $I_1$ and the scale may therefore be calibrated in terms of any condition varying as a direct function of current $I_1$; in the particular case, in terms of the intensity of radiation from the light source 11 at a particular wavelength or the percentage composition of a particular element in the specimen being analyzed.

Preferably and as shown, the slidewire 14 or equivalent means for varying the standard current may be mechanically coupled to a stylus 40 for tracing on a moving chart 39 the magnitude of current $I_1$ or intensity of the radiation from source 11 as a function of time or of wavelength.

In spectrographic analysis, the light source should be constant but this is seldom true in practice, particularly in industrial plants. For reasons not herein discussed, the light intensity is in fact commonly subject to rapid fluctuations which introduce difficulties in accurate quantitative measurement. In accordance with one aspect of this invention, the effect of these rapid fluctuations upon the sensitive detector is minimized by interposing an averaging network of one or more sections between the detector and the resistor 13. More specifically, there are included in the conductor from the common terminal of resistors 13 and 16 to the contact 21, or equivalent detector input terminal, two serially-connected resistors 26—27 forming the series arms of two filter sections whose shunt arms are formed respectively by the capacitors 28 and 29. This filter, however, as later discussed, introduces negative damping in the response of the detector to rebalancing variations of the standard current $I_2$.

The filter sections need not be of the resistance-capacitance type but may, as will be understood by those familiar with electrical filters, comprise combinations of resistance and inductance, or of resistance, capacitance and inductance.

In the system of Fig. 1, with or without the averaging network, large abrupt changes of the current $I_1$ may cause the automatic rebalancing system to overshoot; that is, the slidewire 14 may be adjusted to greater extent than necessary and so require further adjustment in reverse direction for attainment of balance. In extreme cases this overshooting may persist and so give rise to what is known as "hunting." To retain high sensitivity of the detector for rapid rebalancing and yet avoid such undesirable overshooting or hunting, or more generally, to obtain a smooth rebalancing action or record trace, there is employed a damping network which, in the system shown in Fig. 1, comprises the capacitors 30, 31 and 32, effectively in shunt to the calibrating resistor 16 and forming with the aforesaid resistors 26 and 27 several sections of the damping network. Of these three capacitors, condenser 30 is the most effective for damping because directly in series with the detector across the source of variable standard current; that is, the amplifier input and capacitor 30 in series therewith are directly in shunt to that portion of slidewire 14 between contact 8 and terminal 34 effectively included in the balanceable loop. However, in a particular equipment or for a particular use whether all three capacitors 30, 31 and 32 should or need be used and what their respective capacitance values should be depends upon several factors. Therefore, and as will appear from the following discussion, the proper values of these capacitors to obtain a desired automatic rebalancing characteristic can in many instances be most readily determined empirically by inspection of the record trace resulting upon sudden large change in magnitude of current $I_1$.

The solid line curve A of Fig. 2 corresponds with the record trace when the capacitances of condensers 30, 31 and 32 were, in a given system, corresponding with Fig. 1, respectively .25 microfarad, 0 microfarad, and .3 microfarad. As apparent from the curve, the rebalancing action proceeded very rapidly, was checked just before the balance point was reached, and then continued to balance without overshooting; the whole sequence occurring within a total elapsed time of about 0.8 second. This record shows proper damping action for high-speed rebalancing.

In contrast with curve A, reference is made to curve B corresponding with a record trace made under similar conditions except that the capacitances of condensers 30, 31 and 32 were respectively .35 microfarad, 0 microfarad and 0 microfarad. As apparent from the curve, the rebalancing action started rapidly, as before, but was checked well before the balance point was reached, and then continued at decreasing rate until balance was obtained. The total elapsed time is greater, specifically 1 second. However, the pronounced jog or break in the record, due to the premature checking, is objectionable because subject to misinterpretation.

The effect of using a capacitor 30 which is too small to give the desired damping action is evident from curve C of Fig. 2. In this case the respective capacities of condensers 30, 31 and 32 were, respectively, .2 microfarad, 0 microfarad and 0 microfarad. Although checking of the rebalancing action occurred at a time but slightly different from curve A, the rebalancing continued at too rapid rate and overshooting resulted. Final balance was after lapse of .9 second. This sort of record is also objectionable because of the pronounced breaks and because of the overshooting.

From the foregoing it appears that a smooth rebalancing action can be obtained in minimum time by use of a capacitor 30 which is not so large that checking occurs too early in combination with one or both of capacitors 31 and 32 of magnitudes which afford continuance of the rebalancing action after checking at suitable high rate, insufficient, however, to result in overshooting. From these general examples and by use of the foregoing inspection method, the desired response characteristic for any given electromechanical rebalancing system can be empirically determined by selection or adjustment of capacitors 30, 31 and 32. In Fig. 4, later described, provision is made for selection by the user or operator of capacitance values affording the response characteristic suited for a particular measuring use.

In the system such as shown in Fig. 1, having both damping and filtering networks, the effectiveness of capacitors 30, 31 and 32 for damping is not independent of the magnitudes of capacitors 28 and 29 of the filter network. They, too, and particularly capacitor 29, affect the damping action; in fact, their effect or tendency is adverse to the desired damping action, but is overcome by the larger positive damping effect of the network including capacitor 30. When, as shown in Fig. 1, both networks are used in the same system, a preferred procedure is to select values of resistors 26, 27 and capacitors 28, 29 which afford the desired averaging effect upon fluctuations of the current to be measured and then to select values of capacitors 30, 31 and 32 which afford the desired response characteristics of the automatic rebalancing system for large abrupt changes of current $I_1$.

By way of example, typical circuit constants suited for use of the system of Fig. 1 to record the short-circuit current of a photo-multiplier tube used in photometry or spectrographic analysis are given below.

| | | |
|---|---|---|
| Resistor 13 | ohms | 20,000 |
| Resistor 14 | do | 0.8 |
| Resistor 16 | do | 80,000 |
| Resistor 26 | do | 50,000 |
| Resistor 27 | do | 50,000 |
| Capacitor 28 | mfd | 2 |
| Capacitor 29 | do | 1 |
| Capacitor 30 | do | .25 |
| Capacitor 31 | do | 0 |
| Capacitor 32 | do | .3 |

As above stated, when the photo-cell is of the barrier-layer type, it should look into a measuring circuit which to it appears as a short-circuit; when the photo-cell is of the emission type, however, the combination of the cell and its voltage supply should look into a measuring circuit which to the combination appears as a short-circuit. Therefore, when the latter type of cell is used for measurements of the intensity of radiation, as in photometry or spectroscopy, the proper connections are shown in Fig. 3. Specifically, the cell 10A of the emission type and its supply source, generically represented by battery 35, are connected in series with each other to the input terminals or junction points 33, 34 of the network of Fig. 1. When contact 8 is adjusted for null response of the detector, there is substantially zero voltage drop across the junction points 33, 34, and, consequently, no appreciable resistance or voltage is effectively introduced in series in the circuit comprising the cell and supply source 36. With either type of cell, in fact for any other source of unknown current $I_1$, the constants of the filter network are so chosen that it is effective to average out any rapid fluctuations in the magnitude of that current whatever may be their cause, and the constants of the damping network are so chosen that it is effective to afford the desired response characteristic despite the negative damping introduced by the filter network.

In the discussion thus far, it has been assumed that all of the resistor 13 is traversed both by the current $I_1$ being measured and by the variable standard current $I_2$. This condition, for any particular calibrating resistor 16, is for the purpose of the following discussion to be considered as affording the fundamental range of measurement of the system. To extend the range of the instrument for measurement of magnitudes of current $I_1$ as much as a thousand or more times the maximum of the fundamental range, and without need to change calibrating resistor 16 or the variable standard source, the resistor 13 may be an Ayrton shunt or a slidewire having a movable contact 9 connected to the input terminal 33. For such extended ranges, the effectiveness of the filtering and damping networks is not affected and no change in their circuit constants is required to obtain or retain the filtering and damping characteristics previously determined as desirable. However, at balance of the detector, the voltage drop across the whole of resistor 13 is essentially zero, the voltage drop across that portion of the resistor between terminal 34 and contact 9 is not zero, and, therefore, some voltage and resistance are effectively introduced into the circuit under the test.

The introduced voltage E may be expressed as (1) $$E = I_1 Y(1-Y) R_{13}$$

wherein $Y=$fraction of $R_{13}$ between contact 9 and terminal 34 and the introduced resistance R may be expressed as (2) $$R = Y(1-Y) R_{13}$$

In brief, under this circumstance, the measuring network does not appear as an absolute or perfect short-circuit to the source of unknown current but in many cases, and particularly when the range is increased by a factor 10 or higher, the resulting error is within tolerable limits and is warranted because of the enhanced range of measurement.

When it is desired to change the range without introducing resistance into the measuring circuit (at balance), the contact 9 may in effect be moved upwardly along resistor 16 to predetermined positions or taps. For such use, the resistors 13 and 16 may be a single slidewire or a single resistor having a multiplicity of taps, an intermediate one of which connects to resistor 26 of the filter network. With this arrangement the effectiveness of the filtering and damping networks is not affected and no change in the circuit constants of either of them is necessary to retain the response characteristics previously selected as desirable. In so modifying the range of measurement the contact 9 may not be moved too near junction point of resistor 16 with contact 8, as otherwise the error due to changing the resistance in series with the source of standard current becomes too large: the error is not serious so long as that portion of resistor 16 above contact 9, Fig. 1, is of resistance which is high compared to that of slidewire 14.

This difficulty or limitation may be overcome by recourse to the modification shown in Fig. 4 in which the contact 9 is mechanically coupled to a second contact 9A adjustable along resistance 16A so connected that concurrently with adjustment of contact 9 in sense to reduce the effective series resistance in circuit with the standard source 14, the contact 9A is moved in sense to increase the resistance 16A effectively in shunt to it, as seen by the source of standard current. In short, the resistors 16 and 16A are complementarily adjusted so that for all positions of contacts 9 and 9A the resistors 16 and 16A appear as a fixed resistance in series with the source of standard current. Consequently, shifting the range does not vary the relation between the settings of contact 8 and the variable magnitude of the standard current $I_2$.

In this modification, Fig. 4, to facilitate change in the constants of the damping networks to suit a wide variety of fields of measurement, there are provided condensers 28A and 32A respectively for inclusion in the filtering and damping networks under control of a ganged switch 7; there is also provided a fan switch 6 for including in the damping network one or more of the condensers 31—31D. The capacitances of capacitors 28A, 32A and 31 to 31D, respectively, may be 30 mfd., 8 mfd., 2 mfd., 2 mfd., 4 mfd., 8 mfd. and 16 mfd. There are thus afforded seven switch positions corresponding with progressively increasing values of capacitance in the damping network; their effect upon the rebalancing characteristic is most clearly and readily understandable by reference to Fig. 5 and the table below.

Table

|  | Total Capacitance | | | X | Y | Z |
| --- | --- | --- | --- | --- | --- | --- |
|  | 28 | 32 | 31 | | | |
|  | Mfd. | Mfd. | Mfd. | Seconds | Seconds | Seconds |
| Position 1 | 2 | .3 | 0 | 0.7 | 0.1 | 0.8 |
| Position 2 | 32 | 8.3 | 0 | 4.35 | 5.8 | 10.15 |
| Position 3 | 32 | 8.3 | 2 | 6.52 | 10.13 | 16.65 |
| Position 4 | 32 | 8.3 | 4 | 6.52 | 25.4 | 31.92 |
| Position 5 | 32 | 8.3 | 8 | 10.13 | 39.1 | 49.23 |
| Position 6 | 32 | 8.3 | 16 | 15.93 | 66.7 | 82.63 |
| Position 7 | 32 | 8.3 | 32 | 26.8 | 93.4 | 120.2 |

X, time to traverse scale at maximum speed.
Y, excess time to balance for 100% displacement.
Z, total time to balance for 100% displacement.

Fig. 4 also shows a different type of circuit under test. In this case, the mercury-dropping electrode 10B in series and with source of variable direct voltage 36B, such as for example a battery and slidewire, are connected in series with each other across the input terminals 33, 34 of the measuring system. As above described, when the system is in balance, there is zero potential difference between the terminals 33, 34, and the combination of cell 10B and source 36B look into what appears to them as a short-circuit.

In the system shown in Fig. 4, to avoid change in the resistance of the measuring system as seen by the source of standard current, there is shown a combination of variable resistances 16—16A requiring two mechanically coupled adjustable contacts. In the system shown in Fig. 6, the same result is obtained by use of an Ayrton shunt arrangement using but a single movable contact 41. Specifically, the calibrating resistor arrangement 10B comprises in shunt to the measuring resistor 13 a series of resistors 44 and a resistance 45. With the range-selecting contact 41 in the position shown, there are two paths in parallel across the source of standard current; one of them includes all of the sections 44 of the calibrating resistor in series with the measuring resistance 13, and the other path comprises the resistor 45. When movable contact 41 is moved selectively to engage the next fixed contact, one of the paths in shunt to the standard source comprises a resistance 42, the resistors 44 to the left of contact 41, and the measuring resistor 13; the other path includes the resistor 45 and that resistor 44 to the right of the selected fixed contact. The magnitude of this resistor 42 is so chosen that the total resistance of the two paths between contact 41 and the terminal 34 remains the same as before, so that the change in range setting has no effect upon the resistance of the measuring system as seen from slidewire 14, the source of variable current. And so for each of the other settings of the movable contact 41, there is effectively included in series with it a resistance 42 of proper magnitude to maintain constant the resistance of the measuring system so far as the source of standard current at terminals 34, 35 is concerned. Moreover, the resistor 45, and each of the resistors 42 and 44, may be shunted by a condenser 43 of suitable capacity, so that regardless of the setting of the range contact 41, the measuring system has the same filtering and damping characteristics. It shall be understood that the system of Fig. 6, like that of Fig. 4, may be provided with the gang switch 7, fan switch 6 and their associated auxiliary capacitors to permit selection of the desired response characteristic.

In the system shown in Fig. 7, there is again used the same basic measuring circuit of Fig. 1, but the rebalancing system instead of being of the electro-mechanical type used in Figs. 1, 4 and 6, uses a feed-back amplifier arrangement. For brevity, those components of Fig. 7 having the purpose and function of components previously described, are identified by similar reference characters, differing in some cases by suffix, and the description for brevity will be confined to points of difference.

In Fig. 7, the unbalanced voltage across the resistance 13, due to inequality of the current $I_1$ and $I_2$, is impressed through a supplemental filter 48 upon the input of amplifier 17A having suitable number of stages to afford very high gain. The output of the final tube 49 of the amplifier is rectified and provides the variable standard current $I_2$ traversing the fixed resistor 14A connected across terminals 34, 35 of the basic network. The high gain of the amplifier insures that the variable standard current $I_2$ is at all times maintained essentially equal to the unknown current $I_1$ supplied to input terminals of the measuring network. More specifically, there is included in the anode circuit of tube 49 the primary winding 50 of a transformer 51, the terminals of whose secondary 52 are connected to the fixed contacts 53 of a synchronous rectifier 15A. The movable contact 54 of the rectifier connects to one terminal of the resistor 14A, and the other terminal of the resistor is connected to the center tap of the secondary winding 52. The actuating coil 55 of the vibrator 15A is supplied with current having fixed phase relation with respect to the current supplied to the vibrator coil 19. More specifically, the energizing coil 55 of synchronous rectifier 15A may be connected through resistor 62 across part of the primary of transformer 58 used with the rectifier tube 59 to supply the anode current of the tubes of the amplifier 17A and the energizing current for coil 19 of the vibrator in the input circuit amplifier may be supplied from the remainder of the primary winding, as shown in Fig. 7, through the circuit which includes the resistor 62 in one leg and in the other leg the resistors 60, 61, the latter shunted by condenser 63 of value affording the desired phasing.

In this modification there is included in circuit with the resistor 14A a sensitive meter 57, for example, a microammeter reading from zero to 50 microamperes or calibrated in terms of some condition to be measured by the instrument. In this modification, the primary source of the standard current is not steady, and, consequently, there is provided between it and resistor 14A a suitable smoothing filter network 56. As this system is for substantially instantaneous measurements, the condensers 30 and 32 may be omitted from the damping network and the condenser 31 retained to avoid any tendency to instability.

This system and those previously described can be used, by inclusion of a high series resistance 64, Fig. 8, to measure voltages including low voltages, of the order of millivolts, a range for which ordinary vacuum-tube volt-meters are not suited because of "contact potentials" developed within the tube. The impedance of the measuring system between its input terminals 33', 34 and as seen by the source of unknown voltage $E_x$, may be extremely high, for example, of the order of 2 megohms per volt, and at balance is equal to the resistance of resistor 64 alone as resistor 13 then appears as a short-circuit between junctions 33, 34. Thus, both high accuracy of measurement and inappreciable loading of source $E_x$ are attained. Such modification of the system for measurement of voltages has no adverse effect upon the filtering and damping characteristics predetermined by selection of the constants of the filtering and damping networks. It should be noted that this modification, like all others herein described, involves balance of the currents through resistor 13 from unknown and standard sources connected in series-aiding relation at the circuit junctions 33, 34.

In all modifications, the resistance of resistor 13 may be increased to increase the sensitivity of the measuring system and, in fact, the resistance directly between the junction points 33, 34 of the test and measuring circuits may be made infinitely high by omission of resistor 13, yet in all cases, at balance, the effective resistance between the junction points as viewed from the test circuit is zero. In general, however, it is not desirable to omit resistor 13 or to use inordinately high values thereof for the reason that the transmission characteristic of the measuring circuit from the source of standard current to the detector then has little or no rise with increasing rate of change of the standard current, and, consequently, there is little or no phase advance helpful in attainment of the desired action of the damping network to avoid overshooting and hunting.

It shall be understood the invention is not limited to the particular modifications specifically disclosed and discussed, but that changes may be made within the scope of the appended claims.

What is claimed is:

1. A current-measuring system comprising a resistor traversed by current whose magnitude is to be determined, a source of standard current poled to pass current of known variable magnitude through said resistor in opposition to said first-named current, a fixed range resistor in series with said first-named resistor and said source to predetermine the range of variation of said standard current, a detector for automatically varying said standard current to effect and maintain substantial equality of said currents, a resistance-capacity filter network terminated at its opposite ends by said first resistor and said detector respectively, and a damping network including said range resistor, resistance of said filter network and capacity effectively in series with said detector in a path in shunt to said source.

2. A current-measuring system comprising a resistor traversed by current whose magnitude is to be determined, a source of standard current poled to pass current of known variable magnitude through said resistor in opposition to said first-named current, a fixed range resistor in series with said source and said first-named resistor to predetermine the range of variation of said standard current, means including a detector for automatically varying said standard current to effect and maintain substantial equality of said currents, a filter circuit interposed between said detector and said first-named resistor and including at least one section of series resistance and shunt capacitance, and a damping circuit interposed between said detector and said current source and including said range resistor, at least part of said series resistance of said filter network and shunt capacitance external to said filter network.

3. A system for spectrographic analysis comprising a photoelectric cell of the barrier-layer type for viewing the spectrum, a resistor traversed by the output current of said cell, means for reducing the voltage drop across said resistor to inappreciable magnitude comprising a properly poled source of standard current, means for automatically varying said standard current including a sensitive detector responsive to appreciable voltage drop across said resistor, and a filter interposed between said detector and said resistor effectively to average rapid fluctuations of the output current of said cell.

4. A system for spectrographic analysis comprising a photoelectric cell of the barrier-layer type for viewing the spectrum, a resistor traversed by the output current of said cell, means for reducing the voltage drop across said resistor to inappreciable magnitude comprising a properly poled source of standard current, means for automatically varying said standard current including a sensitive detector responsive to appreciable voltage drop across said resistor, a filter interposed between said detector and said resistor effectively to average rapid fluctuations of the output current of the cell, and a damping network interposed between said detector and said source to avoid overshooting of said automatic means upon abrupt changes in intensity of the output current of said cell.

5. A system for spectrographic analysis comprising a photoelectric cell of the emission type and a source of current therefor, a resistor in series with said cell and said source, means for reducing the voltage drop across said resistor to inappreciable magnitude comprising a properly poled source of standard current, means for automatically varying said standard current including a sensitive detector responsive to appreciable voltage drop across said resistor, and a filter interposed between said detector and said resistor effectively to average rapid fluctuations of the current through said cell.

6. A system for spectrographic analysis comprising a photoelectric cell of the emission type and a source of current therefor, a resistor in series with said cell and said source, means for reducing the voltage drop across said resistor to inappreciable magnitude comprising a properly poled source of standard current, means for automatically varying said standard current including a sensitive detector responsive to appreciable voltage drop across said resistor, a filter interposed between said detector and said resistor effectively to average rapid fluctuations of the output current of the cell, and a damping network interposed between said detector and said source to avoid overshooting of said automatic means upon abrupt changes in intensity of the output current of said cell.

7. A system for measuring the current passed by a mercury-dropping electrode comprising a resistor in series with said electrode and the source of voltage therefor, means for reducing the voltage drop across said resistor to inappreciable magnitude comprising a properly poled source of standard current, means for automatically varying said standard current including a sensitive detector responsive to appreciable voltage drop across said resistor, a filter interposed between said detector and said resistor effectively to integrate rapid fluctuations of the voltage drop across said resistor but introducing negative damping in said detector to variation of the standard current, and a positive damping network interposed between said detector and said source to effect smooth slow response of said automatic means to the intermittent current of said dropping electrode and its source of voltage.

8. A current-measuring system comprising a resistor traversed by current whose magnitude is to be determined, a source of variable standard current comprising a feed-back resistor having its positive and negative terminals respectively connected to the negative and positive terminals of the first-named resistor, a calibrated range resistor in series with said feed-back resistor and said first-named resistor, an amplifier having said feed-back resistor in its output system and upon whose input is impressed the voltage drop across said first-named resistor, filtering and damping networks including capacitors, said calibrated resistor and said first-named resistor, and means for indicating the magnitude of said standard current.

9. A current-measuring system comprising a resistor traversed by current whose magnitude is to be determined, a source of variable standard current comprising a feed-back resistor having its positive and negative terminals respectively connected to the negative and positive terminals of the first-named resistor, a calibrated range resistor in series with said feed-back resistor and said first-named resistor, an amplifier having said feed-back resistor in its output system, an input circuit for said amplifier including said first-named resistor and a filter network, and a damping network including said calibrated resistor and at least one element of said filter network.

10. A balanceable electrical network for measuring the magnitude of unknown current from a source connected to a pair of junction points and which network at balance appears to said source as a short-circuit between said junction points comprising a sensitive detector, means connecting said detector across said junction points and including a filter for attenuating rapid fluctuations of said unknown current but which filter during rebalancing of said network introduces negative damping conducive to instability of said sensitive detector, a source of variable standard current connected to said junction points with its negative pole connected to that junction point which is connected to the positive pole of said first-named source and with its positive terminal connected to that junction point which is connected to the negative terminal of the first-named source, and a resistance-reactance network in connections from said source of variable standard current to said detector to provide positive damping insuring stability of said sensitive detector despite aforesaid negative damping characteristic of said filter.

11. An automatically balanceable electrical network for measuring the magnitude of unknown current from a source connected to a pair of junction points and which network at balance appears to said source as a short-circuit between said junction points comprising a sensitive detector, means connecting said detector across said junction points and including a filter for attenuating rapid fluctuations of said current but which filter during rebalancing of said network introduces negative damping conducive to instability of said sensitive detector, a source of variable standard current connected to said junction points with its negative pole connected to that junction point to which is connected the positive pole of said first-named source and with its positive pole connected to that junction point to which is connected the negative pole of the first-named source, means controlled by said detector in response to changes in magnitude of said unknown current automatically to vary said standard current to magnitudes for which said network appears as a short-circuit between said junction points, and a resistance-reactance network in connections from said source of standard current to said detector to provide positive damping insuring stability of said sensitive detector during rapid rebalancing and despite aforesaid negative damping characteristics of said filter.

12. A balanceable electrical network for measuring the magnitude of unknown current from a source connected to a pair of junction points and which network at balance appears to said source as a short-circuit between said junction points comprising a resistor connected between said junction points, a source of standard current connected to said junction points with its negative pole connected to that junction point to which is connected the positive pole of said first-named source and with its positive pole connected to that junction point to which is connected the negative pole of said first-named source, each of said sources therefore having a direct-current path through said resistor which does not include the other of said sources, a sensitive detector connected to said junction points for response to unbalance of the currents from said sources through the common shunt path including said resistor, means for varying said standard current for balance of said currents corresponding with null response of said detector, and a filter network in the connections from said detector to said resistor which attenuates the effect of rapid fluctuations of the unknown current upon said detector and which introduces negative damping of the detector to rebalancing adjustments of said standard current.

13. A system as in claim 12 in which the means for varying the standard current is an adjustable slidewire and in which in series with said slidewire and said resistor is connected a fixed range-determining resistance of preselected magnitude providing for adjustment of said standard current by said slidewire through a desired range of measurement of said unknown current.

14. In a system for recording the magnitude of an unknown current, a balanceable electrical network which at balance appears to the source of said current as a short-circuit comprising a resistor traversed by said current, a source of standard current having its negative pole connected to that terminal of said resistor to which is connected the positive terminal of said source of unknown current and having its positive pole connected to that terminal of said resistor to which is connected the negative terminal of said source of unknown current, a sensitive detector connected across said resistor, a slidewire adjustable under control of said detector to effect rebalancing adjustments of said standard current, and a reactance-resistance network connected between said slidewire and said detector to provide positive damping of said detector by said variations of said standard current produced by adjustments of said slidewire.

15. A system as in claim 14 in which the damping network comprises a resistance connected between said resistor and said slidewire and of preselected magnitude providing for adjustment of said standard current by said slidewire through a desired range of recording of magnitudes of said unknown current.

16. A balanceable electrical network for measuring the magnitude of unknown current from a source connected to a pair of junction points and which network at balance appears to said source as a short-circuit between said junction points comprising a resistor connected between said junction points, a source of standard current connected to said junction points with its negative pole connected to that junction point to which is connected the positive pole of said first-named source and with its positive pole connected to that junction point to which is connected the negative pole of the first-named source, a second resistor in the connection from one of said junction points to one terminal of said source of standard current, a sensitive detector connected across said first resistor, a third resistor in the connection from said one of the junction points to one terminal of said detector, means including said detector for adjusting said standard current for balance of said currents through said first resistor, and a positive damping network between said detector and said source of standard current comprising said second resistor, said third resistor and a capacitor connected from said terminal of said source of standard current to said terminal of the detector.

17. A balanceable electrical network for measuring the magnitude of unknown current from a source connected to a pair of junction points and which network at balance appears to said source as a short-circuit between said junction points comprising a resistor connected between said junction points, a source of standard current connected to said junction points with its negative pole connected to that junction point to which is connected the positive pole of said first-named source and with its positive pole connected to that junction point to which is connected the negative pole of the first-named source, a second resistor in the connection from one of said junction points to one terminal of said source of standard current, a sensitive detector connected across said first resistor, a filter for attenuating rapid fluctuations of the unknown current but introducing negative damping of said detector for variations of the standard current comprising at least a third resistor in the connection from said one of the junction points to said detector and a capacitor in shunt to said detector through said third resistor, and a positive damping network between said detector and said source of standard current comprising said second resistor, said third resistor and a capacitor in a connection from said one terminal of the source of standard current to said one terminal of the detector.

18. A balanceable electrical network for measuring the magnitude of unknown current from a source connected to a pair of junction points and which network at balance appears to said source as a short-circuit between said junction points comprising a resistor connected between said junction points, a source of standard current connected to said junction points with its negative pole connected to that junction point to which is connected the positive pole of said first-named source and with its positive pole connected to that junction point to which is connected the negative pole of the first-named source, a second resistor in the connection from one of said junction points to one terminal of said source of standard current, a sensitive detector connected across said first resistor, a filter for attenuating rapid fluctuations of the unknown current but introducing negative damping in said detector for variations of the standard current comprising resistors in the connection from said one of the junction points to said detector and capacitors respectively connected from said resistors to the other of said junction points, and a positive damping network between said detector and said source of standard current comprising said last-named resistors and capacitors respectively connected from them to said one terminal of the source of standard current.

19. A balanceable electrical network for measuring the magnitude of unknown current from a source connected to a pair of junction points and which network at balance appears to said source as a short-circuit between said junction points comprising a resistor connected between said junction points, a source of variable standard current having its negative and positive poles respectively connected to the junction points to which the positive and negative poles of the first-named source are respectively connected, a sensitive detector connected to said junction points for response to unbalance of the currents from said sources through said resistor, a resistance-capacity filter network terminated at its opposite ends respectively by said resistor and said detector for attenuating rapid fluctuations of the unknown current but productive of negative damping in said detector during rebalancing variations of the standard current, and a positive damping network between said detector and said source of standard current including at least one resistor of said filter network and at least one capacitor effectively in series with said detector in a path in shunt to said source of variable standard current.

ALBERT J. WILLIAMS, Jr.

REFERENCES CITED

The following references are of record in the file of this patent:

UNITED STATES PATENTS

| Number | Name | Date |
| --- | --- | --- |
| 2,150,006 | Parker et al. | Mar. 7, 1939 |
| 2,267,551 | Cherry | Dec. 23, 1941 |
| 2,285,482 | Wunsch | June 9, 1942 |
| 2,300,742 | Harrison et al. | Nov. 3, 1942 |
| 2,302,049 | Parker et al. | Nov. 17, 1942 |
| 2,343,885 | Coleman | Mar. 14, 1944 |
| 2,368,912 | Barnes, Jr. | Feb. 6, 1945 |